United States Patent [19]

Mori et al.

[11] Patent Number: 5,551,047
[45] Date of Patent: Aug. 27, 1996

[54] METHOD FOR DISTRIBUTED REDUNDANT EXECUTION OF PROGRAM MODULES

[75] Inventors: Kinji Mori, Tokyo; Masayuki Orimo, Kawasaki; Hirokazu Kasashima, Hitachi, all of Japan; K. H. Kim, Irvine, Calif.

[73] Assignee: The Regents of the Univeristy of California, Oakland, Calif.

[21] Appl. No.: 10,649

[22] Filed: Jan. 28, 1993

[51] Int. Cl.$^6$ ................................................. G06F 15/16
[52] U.S. Cl. ................. 395/800; 395/182.09; 364/230.6; 364/260; 364/268.3; 364/DIG. 1
[58] Field of Search ................................. 395/800, 650, 395/575, 500, 200, 700, 275, 200.03, 200.15, 182.09, 182.11, 183.14, 185.01; 371/9.1, 11.3, 12, 14, 19, 48, 67.1, 68.1, 68.3

[56] References Cited

U.S. PATENT DOCUMENTS

| | | | |
|---|---|---|---|
| 4,698,785 | 10/1987 | Desmond et al. | 371/19 |
| 4,807,228 | 2/1989 | Dahbura et al. | 371/9 |
| 4,872,106 | 10/1989 | Slater | 395/575 |
| 4,965,718 | 10/1990 | George et al. | 395/425 |
| 5,317,726 | 5/1994 | Horst | 395/575 |

OTHER PUBLICATIONS

Kinji Mori, et al., "Autonomous Decentralized Software Structure and Its Application," IEEE, Proceedings of the Fall Joint Computer Conference, Nov. 2–6, 1986, pp. 1056–1063.

K. H. Kim, et al., "Distributed Execution of Recovery Blocks: an Approach for Uniform Treatment of Hardware and Software Faults in Real–Time Applications," *IEEE Transactions on Computers*, vol. 38, No. 5, May 1989, pp. 626–636.

Primary Examiner—Alyssa H. Bowler
Assistant Examiner—Alpesh M. Shah
Attorney, Agent, or Firm—Knobbe, Martens Olson & Bear

[57] ABSTRACT

A method for organizing and programming distributed computer systems in which processors are connected via interconnection or communication networks, such that even if many cases of hardware and software faults occur within the processors or within the networks, such faults do not lead to the failures in the application's computation. Parallel and asynchronous execution of multiple versions of a program module is performed with processors which are connected by a network without involving any direct interaction between the processors during the execution of the same or different versions of the program module. The process includes a step for executing, for each of the distributed program modules, the primary version and its backup version concurrently by use of multiple processors, a step for checking, in each processor, the logical acceptability of the output data produced from its execution of a program module version, a step for sending, in each processor, the acceptable output data to the transmission paths, a step for receiving, in each processor, the message from the transmission paths, checking the logical acceptability of each received message, and detecting the messages belonging to the same program module, and a step for selecting, in each processor, a message based on a selection logic.

18 Claims, 5 Drawing Sheets

METHOD FOR DISTRIBUTED REDUNDANT EXECUTION OF PROGRAM MODULES

BACKGROUND OF THE INVENTION

1. Field of the Invention

The present invention relates to a method of organizing and programming distributed computer systems in which processors are connected via interconnection or communication networks, such that multiple of hardware and software faults occurring in both the processors and networks do not lead to the failures of application computations.

2. Description of the Prior Art

An approach for uniform treatment of hardware and software faults in distributed computer system was described in an article by K. H. Kim and H. O. Welch, entitled "Distributed Execution of Recovery Blocks: An Approach for Uniform Treatment of Hardware and Software Faults in Real-Time Applications," IEEE Transactions on Computers, Vol 38, No. 5 May 1989 [*Kim 89]. This paper described the distributed recovery block scheme which was based on a combination of both the distributed redundant processing concept and the recovery block structuring method. Recovery block is a language construct which was developed in J. J. Horning, H. C. Lauer, P. M. Melliar-Smith, and B. Randell, and was described in an article entitled "A Program structure for Error Detection and Recovery," Lecture Notes in Computer Science, Vol. 16, New York: Springer-Verlag, 1974, pp. 171–187. It supports incorporation of program redundancy into a fault-tolerant program in a concise and easily readable form.

The syntax of recovery block is as follows: ensure T by B1 else by B2 . . . else by Bn else error. Here, T denotes the acceptance test (AT), B1 is the primary version of a program module, and Bk, where 1<k<m, the backup versions. All of the versions of the program module are designed to produce the same or similar computational results. The acceptance test is a logical expression representing the criterion for determining the acceptability of the execution results of the versions. An execution of a version of the program module is thus always followed by an acceptance test. For the sake of simplicity in exposing the basic principles, the distributed recovery block scheme was described only for the cases where a recovery block contains two versions of a program module.

In the distributed recovery block scheme, a recovery block was duplicated into two processor nodes which together form a distributed recovery block computing station. One of the nodes in the distributed recovery block station functioned as the primary node at any given time while the other functioned as the shadow node. The primary node used the primary version in the recovery block as its first version for processing a new input data item. The shadow node used the backup version as the first version for processing a new input data item. After receiving the common input data item from the predecessor computing station, the two nodes then proceeded concurrently to execute their respective two different versions first, followed by an application of the same acceptance test to the results.

In a fault-free situation, both nodes will pass the acceptance test with the results computed with their first used versions. In such a case, the primary node notifies the shadow of its success in the acceptance test. Thereafter, only the primary node sends its output to the successor computing stations.

However, if the primary node fails its test while the shadow node passes its test, the shadow node will take over the role of the primary as soon as it receives notice that the primary node has failed. If the primary node is completely lost, i.e., crashes, such that it is unable to notify the shadow node of the failure of its test, the shadow node will recognize the failure of the primary upon the expiration of a present time limit.

In this scheme, a status exchange mechanism exists between the primary node and the shadow node. Such a status exchange mechanism is necessary in order to detect the failure of the partner node as well as to minimize the frequency of both nodes sending their computation results to the successor computing stations.

Moreover, given the above scheme as a starting point, systems utilizing the scheme require increasingly more complicated types of status exchange mechanisms as the number of shadow nodes forming a distributed recovery block station increases beyond two. As a result, it is highly expensive to construct a distributed recovery block computing station which redundantly executes a recovery block containing more than two versions by use of more than two processor nodes.

In addition, and even where only two nodes are present, in the case where the primary node crashes, the shadow node can take over the role of the primary node only after the expiration of the time limit is detected. Therefore, recovery time is much greater in this case than in the case where the primary node merely fails in its acceptance test and is still capable of sending a notice to the shadow node.

Another approach for dealing with hardware faults in distributed computer system was described in an article by K. Mori et al., entitled "Autonomous Decentralized Software Structure and Its Application," Proc. of FJCC 1986 [Mori 86*]. In this method when there exist a plurality of processors for executing the same program module, all of the processors send their execution results to the transmission network without any selective coordination among themselves. As a result, each consumer processor on the receiving side must recognize redundancy among multiple received messages. Each consumer node then selects an acceptable one of the messages which have come through the network from different producer nodes which have executed the same program module.

With this method, the messages produced from multiple parallel executions of the same program module are collected during a fixed period of time. After the expiration of the fixed time period, an acceptable result value is selected by application of the majority decision logic in the case where the producer computing station uses more than three processors executing the same program module, to assure a high degree of data integrity. However, in the case where the producer station uses two processors for execution of the same program module, a value cannot be selected which can be expected to have a high degree of confidence in its data integrity. A mismatch of the contents of the two messages produced from dual parallel executions of the same program is inherently unreliable. In this conventional method, the same program module is executed in multiple processors. Therefore, this conventional method is only effective for hardware faults and not effective for software faults.

SUMMARY OF THE PRESENT INVENTION

The present invention relates to a method for organizing and programming distributed computer systems in which processors are connected via interconnection or communication networks, such that even if many cases of hardware and software faults occur within the processors or within the networks, such faults do not lead to the failures in the application's computation.

The occurrence of faults causes little or no delay to the application's computation, although the fault detection mechanisms are always in action and thus contribute a certain amount of execution overhead. The method is suitable for use in producing a variety of real-time distributed computer control systems as well as non-real-time commercial transaction processing systems.

The present method utilizes as a starting point the distributed recovery block scheme as defined in [Kim 89], but is significantly modified as follows. First, the modification involves completely removing the interaction between the processors belonging to the same distributed recovery block computing station. Second, within the successor computing station, is added the capability of selecting one of the acceptable results produced by the multiple processors in the processor distributed recovery block computing station. The newly formulated mechanism which handles the selection of one of the acceptable results is referred to as the input acceptance test.

The present method has several major characteristics. Parallel and asynchronous execution of multiple versions of a program module is performed with processors which are connected by a network. This includes the simple case where the same version of an application is allocated to multiple processors. There is no need for direct interaction between the processors during the execution of the same or different versions of the program module.

The present method also utilizes two types of acceptance tests. One type is referred to as a result acceptance test for validation of the execution results of a program module and the other is referred to as an input acceptance test for validation and redundancy-detection of input data. These two types of acceptance tests are allocated to each processor together with a program module/version.

The input acceptance test has a general structure and can be used in a processor for selectively accepting reliable results from one or more producer processors of various types, as for example, producer processors executing the same version or different versions and producers with or without result acceptance tests. It can also have both logic and time tests.

Therefore, under the present method, the distributed processing system that contains a plurality of processors connected via transmission paths, includes (1) a step for executing, for each of the distributed program modules, the primary version and its backup version concurrently by use of multiple processors, (2) a step for checking, in each processor, the logical acceptability of the output data produced from its execution of a program module version, (3) a step for sending, in each processor, the acceptable output data to the transmission paths, (4) a step for receiving, in each processor, the message from the transmission paths, checking the logical acceptability of each received message, and detecting the messages belonging to the same program module, that is, the messages sent from the processors executing the primary and backup versions, (5) a step for selecting, in each processor, a message based on a selection logic.

Under the present method, and because there is no need for interaction between the primary node and the shadow node, it is easy to construct a system which executes multiple versions (more than two versions) of program module with processors connected by a network. That is, the system which has a high degree of tolerance of both software faults and hardware faults can be constructed easily.

BRIEF DESCRIPTION OF THE DRAWINGS

The present invention will be apparent from the following detailed description, which shows the two embodiments (one for single-version mode operation and the other for multiple-version mode operation) of this invention, taken in conjunction with the accompanying drawings in which.

DETAILED DESCRIPTION

Figure 1:
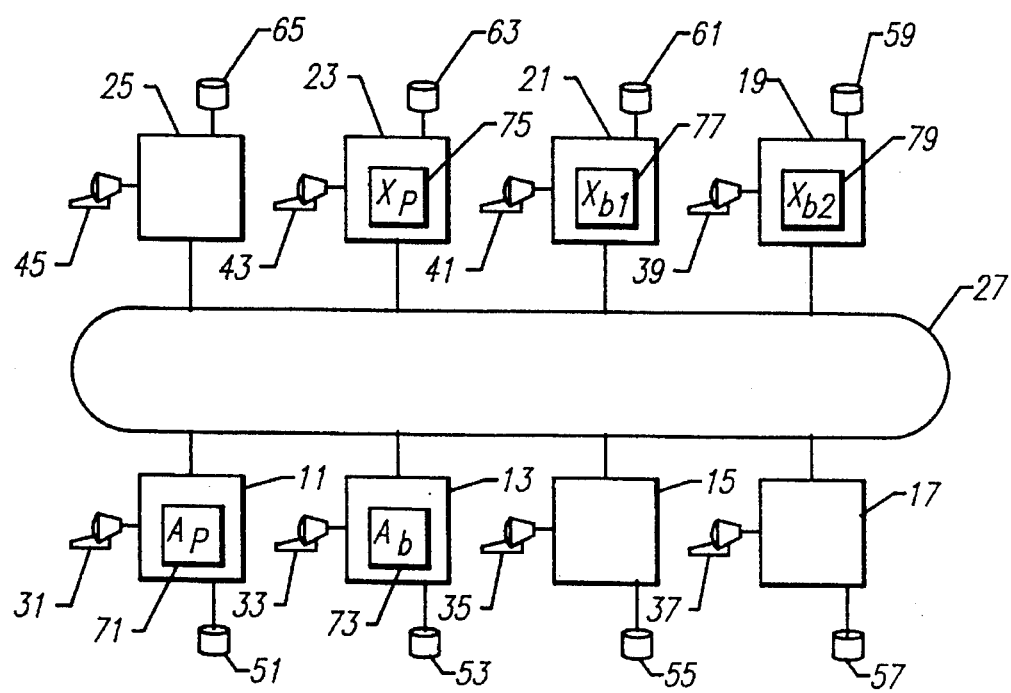
FIG. 1 is a schematic block diagram showing a system configuration of two embodiments of the present invention.

The details of the present method will be described with reference to the accompanying drawings. FIG. 1 is an entire configuration diagram for a system of the embodiment. In the following embodiment, although the transmission paths connecting the respective processors are explained with a loop transmission line system as an example, the processing is the same even if any type of network such as a bus-type of network is used.

The system of FIG. 1 includes processors 11, 13, 15, 17, 19, 21, 23, and 25 each storing in a memory thereof an application module to be executed. A unidirectional loop transmission line 27 acts as a transmission medium and connects each of the processors 11, 13, 15, 17, 19, 21, 23, and 25 to enable the unidirectional transmission. It is understood that any of a number of structures may be used as the transmission medium, and that transmission line 27 is only one example, selected for ease of understanding in the Figures. Terminals 31, 33, 35, 37, 39, 41, 43 and 45 and disks 51, 53, 55, 57, 59, 61, 63, and 65 are each separately connected to an associated one of the processors 11, 13, 15, 17, 19, 21, 23, and 25. It is not necessary that each of the processors 11, 13, 15, 17, 19, 21, 23, and 25 have either a terminal or a disk, or both. Other devices may also be connected to processors.

In the embodiment of FIG. 1, multiple versions of an application program are executed in different processors 11, 13, 15, 17, 19, 21, 23, and 25. A primary version module $A_p$ 71 and its backup version module $A_b$ 73, are used as the first versions in the processors 11 and 13, respectively. A primary version module $X_p$ 75 and its first backup version module $X_{b1}$ 77, second backup version module $X_{b2}$ 79 are used as the first versions in the processors 23, 21, and 19, respectively. The primary version module and its backup version modules are assumed to have the same module name. That is, both of the versions $A_p$ and $A_b$ have the same name A, while all of the versions $X_p$, $X_{b1}$ and $X_{b2}$ have the same name X. The case where only one version of program module A and only one version of program module X are used in the system is one specific instance of the embodiment of FIG. 1 and is covered by the following description.

Figure 2:
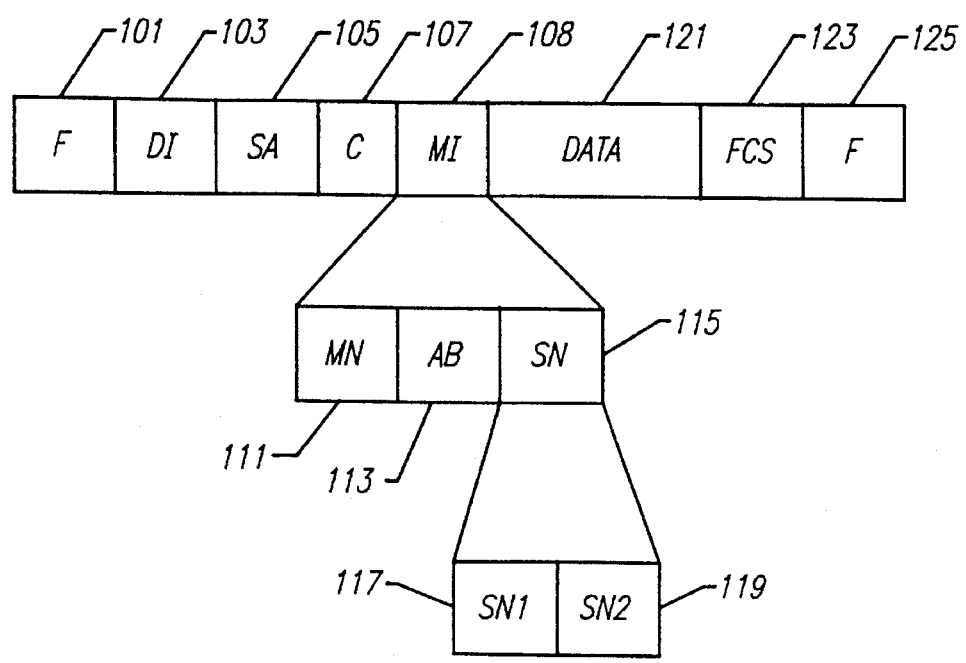
FIG. 2 shows the format of messages passing through the transmission line.

FIG. 2 shows the format of a message passing through the transmission line 27 in a frame format. A block F 101 is a flag indicating the beginning of a message. A block DI 103 is a destination information block which indicates the processors which are to receive this message. In the DI 103 area, the user may substitute, in place of the information indicating receiving processors, information indicating the module name which is started by this message. Alternatively, the user may substitute information indicating the content-type of the data contained in the block data, to be described, of the message. Each processor judges, based on the content of the DI 103 area, whether or not the received message is intended for itself.

A block SA 105 indicates an address of the processor that has sent this message, also known as the source address. A block C 107 is a control code necessary for message transmission.

A block MI 109 is a module information block and is the area for storing the information about the module which produced this message. The block MI 109 consists of subblocks MN 111 which indicates the name of the module, AB 113 which indicates the attribute of the module, and SN 115 which indicates the sequence number of the module execution. SN 115 consists of two parts, a block SN1 117 indicating the sequence number of the module execution, and SN2 119 indicating the sequence number assigned to this message at the time of its production during the module execution.

A block DATA 121 is an application data block, and contains the information which the producer program module intends to provide to consumer program modules. The other sections of the frame of FIG. 2 carry designated pieces of information necessary to the functioning of the frame within the system, but the Data 121 block is the freely specifiable data which the frame may carry. A block FCS 123 contains data for error detection. A block F 125 is a flag indicating the ending of the message of the frame of FIG. 2.

Figure 3:
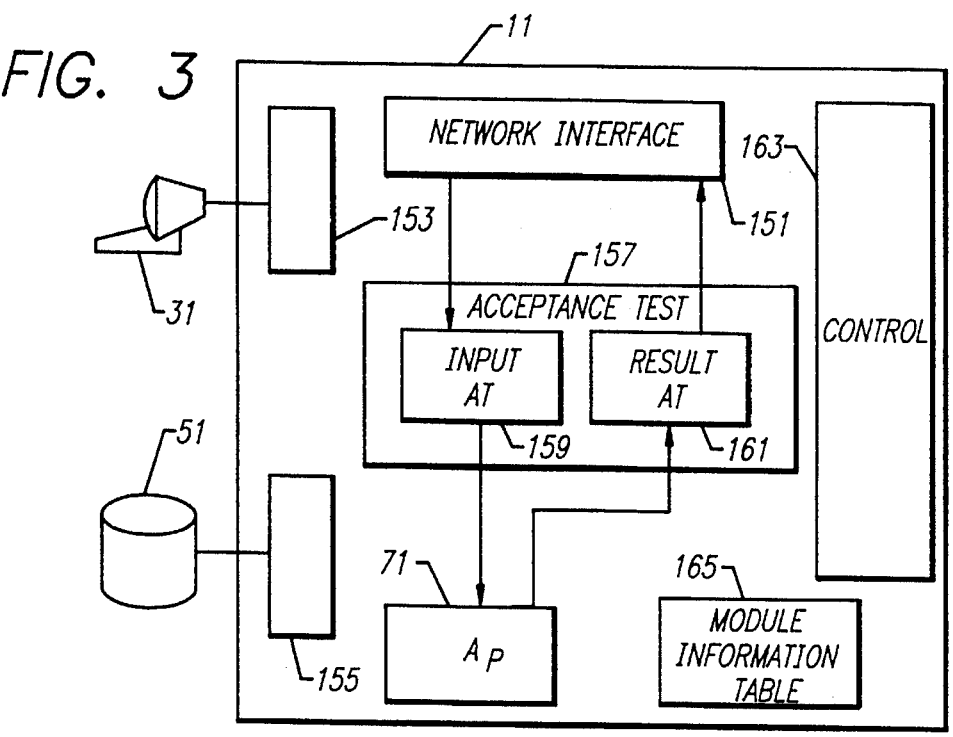
FIG. 3 is a schematic diagram depicting an internal configuration of a processor and a processing flow according to the present invention.

FIG. 3 is a schematic diagram showing an internal configuration of the processor 11 of FIG. 1. The other processors 13, 15, 17, 19, 21, 23, and 25 are also of the same configuration except for the application modules. A network interface module 151, a terminal interface module 153 and a disk interface module 155 are located within processor 11, and are system software modules. An acceptance test module 157 includes an input acceptance test module 159 and a result acceptance test module 161. The acceptance test module 157 is a system software module that can use submodules supplied by the application module design, although in some applications, the submodules may be omitted. In such a case, a common acceptance test may be used.

The module $A_p$ 71 is an application module. A processor can contain and execute a plurality of application modules within a single processor 11. A control module 163 controls the execution of each module in the processor. The network interface module 151 is used to achieve message transfer between the processor 11 and the transmission line 27. A message generated by an application module $A_p$ 71 is sent to the network by way of network interface module 151. A message sent to the network is received by the network interface modules like network interface module 151 which exist in all processors 13, 15, 17, 19, 21, 23, and 25 connected to the network. And the network interface module of each processor selects the message relevant to the processor in which that network interface module resides. Then, once the relevant message is selected, this selected message is sent to the input acceptance test module 159 within the one of the processors 13, 15, 17, 19, 21, 23, and 25 whose network interface module selected the message. The process of message selection within the network interface module 151 is done based on the content of DI 103 area of the frame of FIG. 2.

Thus, the process of message selection is based upon the destination information of the received message. The network interface module 151 has a module information table 165 in which the destination information of the messages to be selected is stored. It is also possible to register multiple types of destination information in the module information table 165. An arriving message having the same destination information as the destination information registered in the module information table 165 is selected by network interface module 151.

The input acceptance test module 159 is used to check the content of each received message to insure that it is an input message for the module A. The result acceptance test module 161 is used to check the output data of the executed module A. The terminal interface module 153 is used to achieve a data transfer between the application module $A_p$ 71 and the terminal 31. The disk interface module 155 is used to achieve a data transfer between the application module 71 and the disk 51.

The module information table 165 is the table containing the names and the attributes of the modules which are executed in the processor 11. The module information table 165 has the two counter areas for each application module. A first counter indicates the sequence number of the current or most recent execution of each application module and a second counter indicates the sequence number of the most recently sent message during the current execution of the module. The first counter is incremented at every execution of the application module $A_p$. The first counter in each processor is set to 0 at the time of initialization of the system of FIG. 1.

Figure 4:
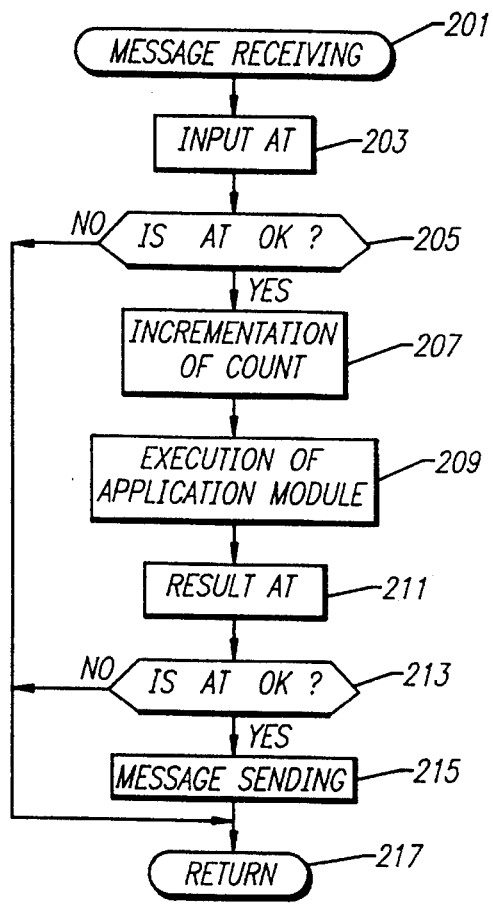
FIG. 4 is a diagram showing the flowchart of operation according to embodiment of single-version mode operation.

FIG. 4 illustrates a processing flow diagram of the processing of frames of information in each of the processors 11, 13, 15, 17, 19, 21, 23, and 25 shown in FIG. 1. At the top of the diagram of FIG. 4, an oval initiation block 201 labeled "MESSAGE RECEIVING" is the first logic block. When the message is received from the network transmission line 27, the logic flows to an "INPUT AT" block 203, and then to a "IS AT OK?" block 205. Blocks 203 and 205 in essence perform an input acceptance test for the received message.

In the case where the result of the input AT is not OK, the received message is deleted. In the case where the result of the input AT is OK, this message is accepted. When the input message is accepted, the logic proceeds to the "INCREMENTATION OF COUNT" block 207, and the content of the first counter area in the module information table 108 of FIG. 3 corresponding to the application module to be executed is incremented, and 0 is stored in the second counter area.

Next, the logic flows to an "EXECUTION OF APPLICATION MODULE" block 209. In block 209, the application module $A_p$, which was shown in FIG. 3, is executed using the accepted received message. The content of the second counter section of the information table is incremented when the data is output from the application module $A_p$ during the execution of the application module $A_p$. Next, the logic flows to a "RESULT AT" block 211, and then to a "IS AT OK" BLOCK 213. Blocks 211 and 213 are essentially an acceptance test performed for the output data of the application module $A_p$. If the result of this test is OK, the logic flows to a "MESSAGE SENDING" block 215, and an output message prepared according to the format in FIG. 2 is sent to the network including transmission line 27 by way of the network interface 151 of FIG. 3. In the case where the result AT is not OK, this computed result message is not sent to the network and is deleted. For example, in the processor 11, the primary version module $A_p$ 71 of FIG. 1 is executed following this processing flow, as is the backup version module $A_b$ executed within processor 13 following this processing flow. Therefore the primary version module ($A_p$) and backup version module ($A_b$) are executed concurrently and asynchronously. The output messages from the primary version module $A_p$ and the backup version module $A_b$ are sent independently to the network, including transmission line 27, by the processor 11 and 13, respectively.

The output data of the executed application modules $A_p$ and $A_b$ are stored in the Data 121 area of the message sent to the network. The identity of the executed application module is stored in the MN 111 portion of the MI 109 area shown in FIG. 2. The AB portion 113 of the MI 109 area is sent according to the following schedule. (I) The output data from primary version $A_p$ is sent as "primary". (II) The output data from backup version $A_b$ is sent as "backup". (III) The output data from primary version $X_p$ is sent as "primary". (IV) The output data from backup version $X_{b1}$ is sent as "backup1". (V) The output data from backup version $X_{b2}$ is sent as "backup2".

The above names and their attributes, as primary or backup, correspond to the executed application module, and are taken from the module information table 165. The content of the first count area of module information table 165 that corresponds to the executed application module is set to the SN1 117 portion of the SN 115 area, as was shown in FIG. 2. Similarly, the content of the second count area of the module information table 165 which corresponds to the executed application module is set to the SN2 119 part of the SN 115 area.

The functions of the input AT 159 and the result AT 161 used in this method may include the following logic.

(1) Logic acceptance test (L-AT: Lr-AT, Li-AT). A logic acceptance test is a test for checking the logical acceptability of the execution results of the application modules $A_p$ 71, $A_b$ 73, $X_p$ 75, $X_{b1}$ 77 or $X_{b2}$ 79. This test is normally a part of the result AT 161 used by a producer node which executes a program module. The logic acceptance test incorporated into the result AT is called Lr-AT below.

However, it may also be used as a part of the input AT by a consumer node which receives the execution result of the program module. This acceptance test incorporated into the input AT is called Li-AT below. In this case, a producer node sends the message which contains not only the execution result of the executed program module but also the input data of that program module. A consumer node checks the logical acceptability of the received message based on both the execution result and the input data contained in the received message.

(2) Time acceptance test (T-AT). A time acceptance test is a test for checking if the limit on the amount of execution time allowed for each application module $A_p$ 71, $A_b$ 73, $X_p$ 75, $X_{b1}$ 77 or $X_{b2}$ 79 is reached. This test is performed by using a watch-dog timer. This test is used as part of the result AT 161 by the producer node which executes an application module. A similar test may also be used normally as a part of the input AT 159 by a consumer node which receives the execution result of the producer node. At the expiration of the allowed time, the input AT 159 checks if the execution result of the producer node arrives within a predetermined time interval.

(3) Data consistency acceptance test (D-AT). A data consistency acceptance test is a test for checking the validity of the message by comparing the contents of the output messages from primary version module $A_p$ 71 or $X_p$ 75, and their respective backup version modules $A_b$ 73, $X_{b1}$ 77 or $X_{b2}$ 79. This test may be used only as a part of an input AT 159 by the receiver node. The data consistency acceptance test may contain several types of selection logic.

The first selection logic, hereinafter LOGIC 1, involves the selection of the first receiving message while ignoring the second, third, and all subsequent received messages. This logic is effective only in the case where both the primary version module $A_p$ 71 or $X_p$ 75, and its backup version modules $A_b$ 73, $X_{b1}$ 77 or $X_{b2}$ 79 output the same data. By applying this first logic, fast forward recovery can be attained even if one of the producer processors fails.

The second selection logic, hereinafter LOGIC 2, involves the selection of the message based on the content of the AB 113 field. The AB 113 field is an indication of whether the frame was output from a primary version module $A_p$ 71 or $X_p$ 75, or a backup version module $A_b$ 73, $X_{b1}$ 77 or $X_{b2}$ 79. A selection of the message which is the output of the primary version module and rejection of the messages which are the outputs of the backup version modules is performed. If the message from the primary version module cannot be received within the predetermined time, then a message from a backup version module is selected.

The third selection logic, hereinafter LOGIC 3, involves a comparison of the contents of the messages from a primary version module, such as $A_p$ 71 and its backup version modules, such as $A_b$ 73. If the contents of the primary and the backup are the same, then one of them is selected. If the contents are not the same, a majority voting logic is used to select a message. Majority voting logic selects the content which occurs a majority number of times. If there are no majority messages, no message selection is made, and a selection failure indicator is returned as the result of this logic. This logic is effective only in the case where both of the primary version module, such as $A_p$ 71 and its backup version modules, such as $A_b$ 73, output the same idea. By applying this LOGIC 3, a very high degree of data integrity is assured by the comparison / voting check.

Further details of LOGIC 3 are illustratable as a six step process. (1) When the message is first received, set the watch-dog timer and store the received message. (2) Store the messages which are received secondly, thirdly, and subsequently. (3) When the watch-dog timer indicates a timeout condition, or when a pre-determined number of messages are received, compare the contents of the stored messages from step (2). (4) If the contents of all the stored messages are the same, then any one of the received messages may be selected. (5) If the contents of all the stored messages are not the same, then a message is selected by application of the majority voting logic. (6) If the message cannot be selected by the majority voting logic, then a selection failure indicator is returned as the result.

Figure 5:
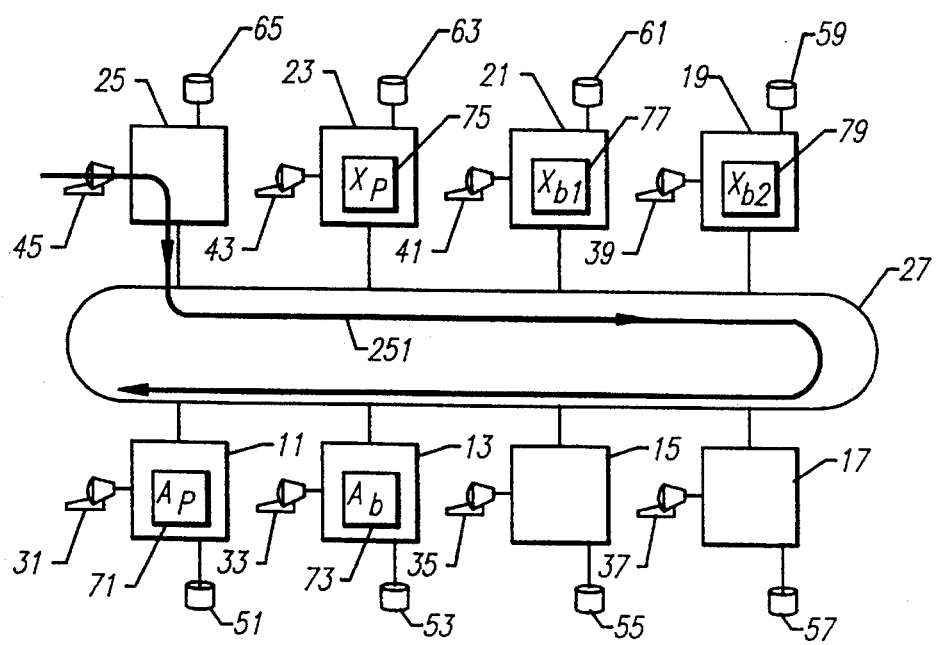
FIG. 5 is a schematic diagram depicting the distributive communications occurring in the system configuration introduced in FIG. 1 at the start of the application process.
Figure 6:
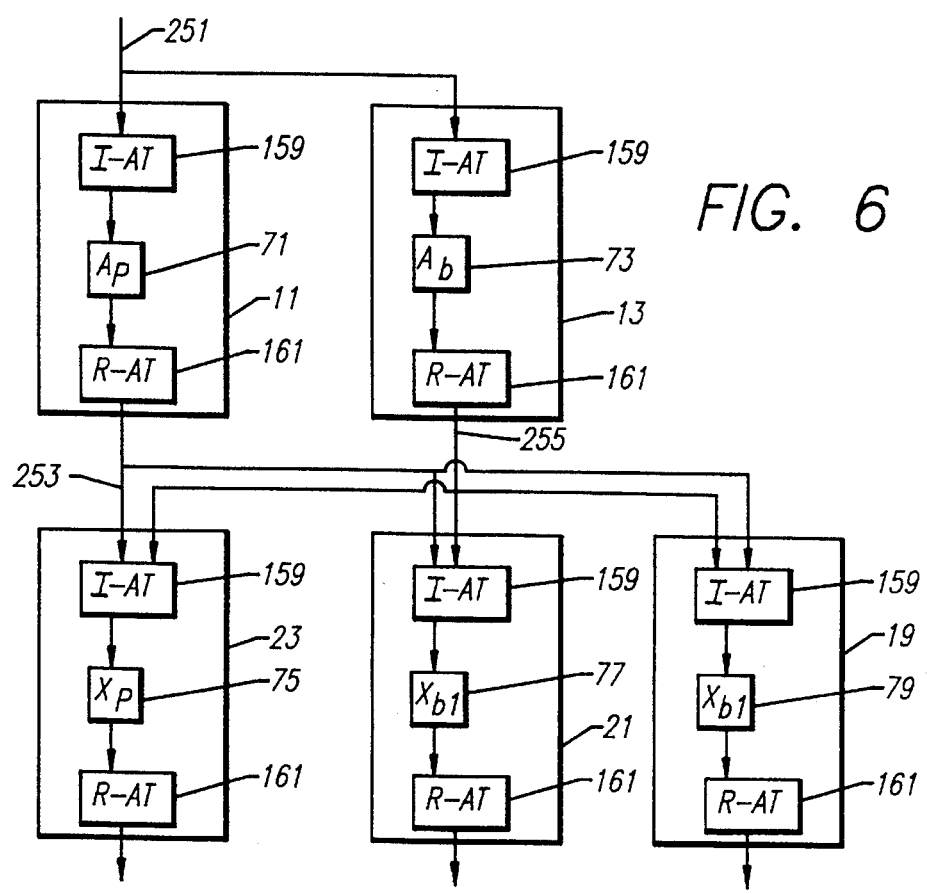
FIG. 6 is an explanatory diagram depicting the parallel execution of multiple versions of a program module and the distributed acceptance test of the embodiment of single-version mode operation.

FIGS. 5 and 6 illustrate the data flow effected in the above described method. FIG. 5 is substantially identical to FIG. 1, and the structures therein are identical to those in FIG. 1 except where noted. FIG. 5 illustrates the start of the application process, which is executed by multiple processors. In FIG. 5, for example, the application process is started from the terminal 45 of the processor 25. Of course, any of the processors 11, 13, 15, 17, 19, 21, 23, and 25 can start the application process, the use of processor 25 being illustrative.

The processor 25 sends a start message 251 to the network including transmission line 27. FIG. 6 shows the processing flow in block diagram style for a normal case. The start message 251 is received by both of the processors 11 and 13. In the normal case, processor 11 executes sequentially input AT 159, primary version module $A_p$ 71, and result AT 161 as already shown in FIGS. 2 and 3. Subsequently, an output message 253 is sent to the network along transmission line 27, not shown in FIG. 6.

In processor 13, the message 251 is processed by the backup version module $A_b$ in the same way as was the case for processor 11. Then an output message 255 is sent to the network. Therefore, the message 253 and 255 have the same module name and number in their MN 111 area and SN 115 area. But the content of AB 113 area of these messages are different. "Primary" is stored in message 253's AB 113 area while "backup" is stored in message 255's AB 113 area. These messages 253 and 255 are received by the processors 19, 21, and 23. In processor 23, an input AT 159 is done for both of the messages 253 and 255 and one of them is selected.

The primary version module $X_p$ 75 of processor 23 is executed using this selected message. And the output message of primary version module $X_p$ 75 is tested by the result AT 161 of processor 23 and sent to the network. In the processors 19 and 21 the messages 253 and 255 are processed by the backup version modules $X_{b2}$ and $X_{b1}$ in the same way as in the case of processor 23.

The three types of acceptance tests, namely the logic acceptance test, time acceptance test, and data consistency acceptance test are incorporated in part or in full complements into input AT's and result AT's. In case 1, the data consistency acceptance test is incorporated into the input AT 159 while the logic acceptance test (Lr-AT) and the time acceptance test are incorporated into the result AT 161. By execution of the data consistency acceptance test, one of the messages 253 and 255 is selected. The system can recognize that the messages 253 and 255 belong to the same processing because they have the same module name and number in the MN 111 and SN 115 portions of MI 109 area.

When the LOGIC 1 data consistency acceptance test is applied, the failure of either processor 11 or 13 makes no influence on the processors 19, 21, and 23 since processors 19, 21, and 23 can execute their operations by using first received messages. In addition, the integrity of the message is assured by the logic acceptance test (Lr-AT) in the result AT 161 used in the producer node. Therefore, fast forward recovery can be attained.

When LOGIC 2 of data consistency acceptance test is applied, the processors 19, 21, and 23 can always use the message from the primary producer processor, namely the processor executing the primary version program module, as long as the primary processor is in operation. When LOGIC 3 of data consistency acceptance test is applied, a very high degree of data integrity can be assured.

In a case 2, the data consistency acceptance test is incorporated into the input AT 159 while the time acceptance test is incorporated in the result AT 161 only. Two types of logic acceptance tests utilized include the logic acceptance test (Lr-AT) for checking the acceptability of the computation results of an application module, and the logic acceptance test (Li-AT) for checking the acceptability of the input data for an application module. Both of these types of logic acceptance tests are incorporated into the result AT 161 and the input AT 159, respectively.

When LOGIC 1 of the data consistency acceptance test is applied, fast forward recovery can be attained for the same reasons which were recited in case 1, and the acceptability of the input data can be assured by the logic acceptance test (Li-AT). When LOGIC 2 of the data consistency acceptance test is applied, the processors 19, 21, and 23 can always use the messages from the primary producer processor, and the acceptability of the input data can be assured by the logic acceptance test (Li-AT).

When LOGIC 3 of the data consistency acceptance test is applied, and if the data consistency acceptance test fails to select one of the messages, an acceptable message can be selected by the logic acceptance test (Li-AT). In this manner, a high degree of availability can be attained.

Since there is no need for interaction among the primary node and shadow nodes under the presented method, it is easy to construct a system which executes more than two versions of the program modules where the processors 11, 13, 15, 17, 19, 21, 23, and 25 are connected by a network, such as transmission line 27. Consequently, a system which has a high degree of tolerance of both software faults and hardware faults can be constructed easily.

In the above embodiment, each processor executes only one of multiple version modules. But it is possible to attain a higher degree of fault tolerance by applying a recovery block scheme in each processor.

Figure 7:
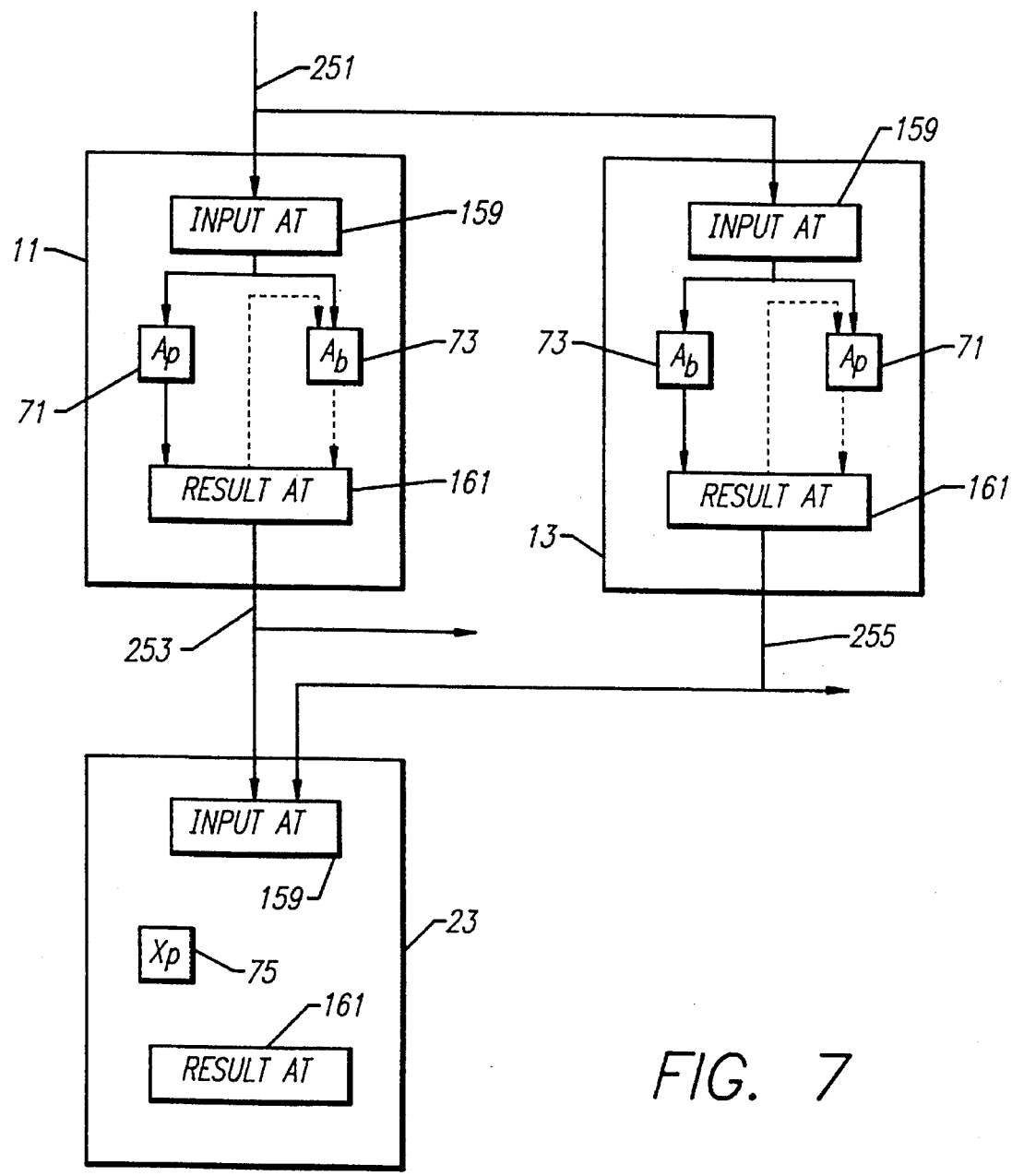
FIG. 7 is an explanatory diagram that depicts the parallel execution of multiple versions of a program module and the distributed acceptance test of the embodiment of multiple-version mode operation.

In a second embodiment of the invention, the primary and back up versions of a module are allocated as a group to every processor belonging to the same redundant computing station. Referring to FIG. 7, the allocation of the primary and backup versions of a module and the processing flow are illustrated in a block format similar to FIG. 6. In FIG. 7, the method is applied only to the processors 11 and 13 and is not applied to the processors 19, 21, and 23. Additionally, processors 19 and 21 are omitted in FIG. 7.

The primary version module $A_p$ 71 and backup version module $A_b$ 73 are fully replicated in both of the processors 13 and 11. However, the roles of two modules $A_p$ 71 and $A_b$ 73 are not the same in the two processors. The processor 11 uses module $A_p$ 71 as the first version, whereas the processor 13 uses module $A_b$ 73 as the first version. Therefore, until a fault is detected, both processors 11 and 13 receive the same message 151, process it by use of two different versions of the module, namely, $A_p$ 71 on the processor 11 and $A_b$ 73 on the processor 13.

Figure 8:
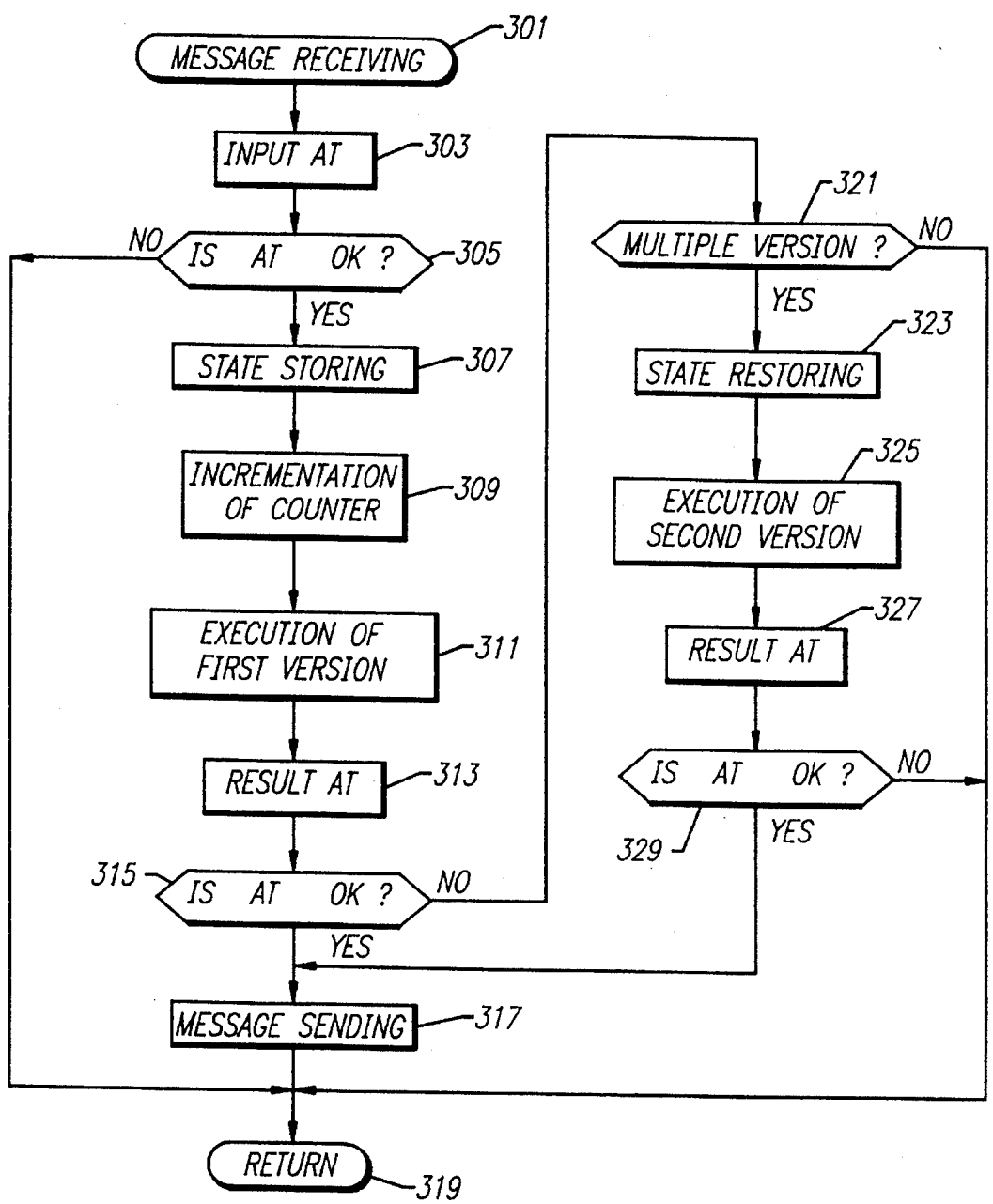
FIG. 8 is a diagram showing the flowchart of operation according to the embodiment of multiple-version mode operation.

FIG. 8 shows a block diagram of the processing logic flow in processors 11 and 13. At the top of the diagram of FIG. 8, an oval initiation block 301 labeled "MESSAGE RECEIVING" is the first logic block. When the message is received from the network, such as transmission line 27 of FIG. 1, the logic flows to an "INPUT AT" block 303, and then to a "IS AT OK?" block 305. Blocks 303 and 305 in essence perform an input acceptance test for the received message. This input AT is the same as the test described in the first embodiment. In the event that AT is not OK, the logic proceeds to the end of the main sequence, as will be discussed later.

In the case where the result of the input AT is not OK, the message received is not used and is deleted. In the case where the result of the input AT is OK, the logic flows to a "STATE STORING" block 307. In block 307, the status information which is necessary for rollback to this point after the execution of the application module is saved in a buffer. Then, the logic moves to a "INCREMENTATION OF COUNTER" block 309 which causes the counter areas in the module information table 165 of FIG. 3 that correspond to the application module to be executed to be incremented. The logic next moves to an "EXECUTION OF FIRST VERSION" block 311. The logic of block 311 causes the first version module on the processors, namely $A_p$ 71 on the processor 11 and Ab 73 on the processor 13, to be executed. In a pair of blocks "RESULT AT" 313, and "IS AT OK" 315, the acceptance test is done for the output data of the respective modules $A_p$ 71 and $A_b$ 73. This result AT is the same as the test described in the first embodiment. If the result of the test is OK, the logic moves to a "MESSAGE SENDING" block 317, a message is prepared in the format in FIG. 2 and is sent to the network, including transmission line 27 of FIG. 1, by way of the network interface module 151 as was shown in FIG. 3. The logic then flows to a "RETURN" block 319. "RETURN" block 319, also receives a logic flow from the "IS AT OK?" block 305 in the event that the test for AT fails.

In the case where the result AT is not OK at block 315, the logic flows to a "MULTIPLE VERSION?" block 321, where an inquiry into whether or not there are multiple versions is made. If there are not multiple versions, the logic flows to the "RETURN" block 319. If there are multiple versions, the logic flows to a "STATE RESTORING" block 323, where the status before the execution of the first version module $A_p$ 71 is recovered based upon the information that was stored during the execution of logic block 307. The logic then proceeds to an "EXECUTION OF SECOND VERSION" block 325, causing the second version module $A_b$ 73 on the processor 11, and $A_p$ 71 on the processor 21, to be executed. The logic than flows to a "RESULT AT" block 327 and an "IS AT OK" block 329, in which the acceptance test is done for the output data of the respective modules $A_p$ 71 in processor 13 and $A_b$ 73 in processor 11. If the acceptance test is met, the logic flows to the "MESSAGE SENDING" block 317, and a message is prepared in the format in FIG. 2 and is sent to the network including transmission line 27 of FIG. 1, by way of the network interface module 151 as was shown in FIG. 3. If the acceptance test is not met, the logic flows to the "RETURN" block 319.

However, in the case where the logic flows from "IS AT OK?" block 329 to a "MESSAGE SENDING" block 317 and a message is sent, the output message includes the information which indicates that the message occurred as the result of a retry, in addition to the formatting which was illustrated in FIG. 2.

In the event that processor 11 crashes, the input AT 159 module of processors 19, 21, and 23 can recognize the crash of processor 11 by detecting the fact that the message 253 from the processor 11 is not received within the predetermined time. Then, the processor 23, the processor which has been executing the primary version module $X_p$, sends a message, indicating the crash of processor 11, to the processor 13. And after receiving this message indicating the crash of processor 11, processor 13 executes the module $A_p$ 71 as the first version.

In addition, processor 23 may detect the situation where multiple producer processors, such as processors 11 and 13, have executed the same version for processing the same data when the messages which have the same MI 109 part have been received. Messages which have the same MI 109 part have the same MN 111 part, the same AB 113 part and same SN 115 parts. In this case, the processor 23 sends the message indicating that both of the processors 11 and 13 have executed the same version. When the module $A_p$ 71 has been used as the first version in both processors 11 and 13, the processor 13 uses the module $A_b$ 73 as the first version after receiving this message. When the module $A_b$ 73 has been used as the first version in both processors 11 and 13, the processor 11 will use the module $A_p$ 71 as the first version after receiving this message. This mechanism is called the version switching suggestion (VSS) mechanism.

The utilization of this method, even if the primary processor which executes the primary version module as the first version crashes, enables assured execution of the primary version module. Moreover, a failure of a version in processing input data does not necessarily lead to the immediate dropout of a given processor from a distributed recovery block computing station. Again, a mechanism for status exchange among processors is not necessary in this method. The elimination of a requirement for an exchange mechanism under the inventive device and method herein provides flexibility and tolerance of both software and hardware faults.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

We claim:

1. A method for distributed redundant execution of program modules in a distributed system which has at least two processors connected by transmission medium and in which only one version of a program module is present and stored in each of at least two processors, said method comprising the steps of:

asynchronously executing, in each of said at least two processors, said program module to produce result data, after receiving an input data message containing input data necessary for the execution;

sending, by each of said at least two processors which executed said program module, to at least one destination processor an information message which contains at least both a result data produced by said execution of said program module and said input data utilized during said program module execution, through the transmission medium; and receiving, in said at least one destination processor, said information messages and selecting one of the received information messages as a new input data message based upon both the result data and the input data contained in said received information messages.

2. A method for distributed redundant execution of program modules in a distributed system which has at least two processors connected by transmission medium and in which only one version of a program module is present and stored in each one of at least two processors, said method comprising the steps of:

asynchronously executing, in each of said at least two processors, said program module to produce result data, after receiving an input data message containing input data necessary for this execution;

checking to conclusion, in each of said at least two processors which executed said program module, acceptability of the result data produced by said asynchronously executing said program module based only upon information within each of said at least two processors;

sending, by each of said at least two processors which executed said program module and completed said checking with positive conclusion about acceptability, to at least one destination processor an information message which contains at least the result data produced by said execution of said program module through the transmission medium; and receiving, in said at least one destination processor, said information messages and selecting one of the received information messages as a new input data message by comparing the contents of the result data in said received information messages.

3. A method for distributed redundant execution of program modules in a distributed system which has at least two processors connected by transmission medium and in which only one version of a program module is present and stored in each one of at least two processors, said method comprising the steps of:

asynchronously executing, in each of said at least two processors, said program module to produce result data, after receiving an input data message containing input data necessary for said execution;

checking to conclusion, in each of said at least two processors which executed said program module, acceptability of the result data produced by said asynchronously executing said program module based only upon information within each of said at least two processors;

sending, by each of said at least two processors which executed said program module and completed said checking with a positive conclusion about the acceptability, to at least one destination processor an information message which contains at least both the result data produced by said execution of said program module and said input data utilized during said program module execution through the transmission medium; and receiving, in said at least one destination processor, said information messages and selecting one of the received information messages as a new input data message based on both the result data and the input data contained in said received information messages.

4. A method for distributed redundant execution of program modules in a distributed system which has at least two processors connected by transmission medium and in which at least first and second different versions of a program module are stored in each one of at least two processors, said method comprising the steps of:

asynchronously executing, in each of said at least two processors, any of said at least first and second different versions of a program module which is stored therein to produce result data, after receiving an input data message containing input data necessary for said asynchronous execution;

sending, by each of said at least two processors which executed a version of the program module, to at least one destination processor an information message which contains at least both the result data produced by said asynchronous execution of said version and the information about said asynchronously executed version and about identity of said sending processor through the transmission medium;

receiving, in said at least one destination processor, said information messages and selecting an acceptable one of the received information messages as a new input data message; and sending, from each destination processor which selected one of the received information messages, a second message which identifies which of said at least two processors produced said information messages that were discovered to be unacceptable during said selecting step, to the processors that produced said information messages.

5. The method for distributed redundant execution of program modules in a distributed system as recited in claim 4, wherein said second message identifies which, if any, of said at least two processors executed a same version of the program module.

6. The method for distributed redundant execution of program modules in a distributed system as recited in claim 4, wherein said selection of one of the received information messages is accomplished by comparing the contents of the result data in the received information messages.

7. The method for distributed redundant execution of program modules in a distributed system as recited in claim 5, wherein said selection of an acceptable one of the received information messages is accomplished by comparing the contents of the result data in the received information messages.

8. A method for distributed redundant execution of program modules in a distributed system which has at least two processors connected by transmission medium and in which at least first and second different versions of a program module are stored in each one of at least two processors, said method comprising the steps of:

asynchronously executing, in each of said at least two processors, any one of said at least first and second different versions of a program module which is stored therein to produce result data, after receiving an input data message containing input data necessary for said asynchronous execution;

sending, by each of said at least two processors, to at least one destination processor an information message which contains at least:

the result data produced by said execution of said one of said at least first and second different versions;

said input data utilized during said execution of said at least first and second different versions;

and information about said executed version through the transmission medium:

receiving, in said at least one destination processor, said information messages and selecting one of the information messages as a new input data message based on the result data and the input data contained in said information messages; and sending, from said each destination processor which selected one of the received information messages, a second message which identifies which of said at least two processors produced said information messages that were discovered to be unacceptable during said selecting step to the processor that produced said information message.

9. The method for distributed redundant execution of program modules in a distributed system as recited in claim 8, wherein said second message identifies which of said at least two processors executed a same version of the program module.

10. A method for distributed redundant execution of program modules in a distributed system which has at least two processors connected by transmission medium and in which at least first and second different versions of a program module are stored in each of at least two processors, said method comprising the steps of:

asynchronously executing, in each of said at least two processors, any one of said at least first and second different versions of a program module to produce result data, after receiving an input data message containing input data necessary for said asynchronous execution;

checking to conclusion, in each of said at least two processors which executed said any one of said at least first and second different versions of the program module, acceptability of the result data produced by said execution based only upon information within each of said at least two processors;

sending, by each of at least two processors which executed one of said at least first and second different versions of the program module, to at least one destination processor an information message which contains at least:
the result data produced by said execution of said any one version and
the information about said asynchronously executed version and about identity of said sending processor through the transmission medium;

and
receiving, in said at least one destination processor, said information messages and selecting one of the information messages as a new input data message.

11. The method for distributed redundant execution of program modules in a distributed system as recited in claim 10, wherein said selecting one of said information messages step is accomplished by selecting a first information message received.

12. The method for distributed redundant execution of program modules in a distributed system as recited in claim 10, wherein said selecting one of said information messages step is accomplished based on the identities of said at least first and second versions of a program module that produced the information messages.

13. The method for distributed redundant execution of program modules in a distributed system as recited in claim 10, wherein said selecting one of said information messages step is accomplished by comparing the contents of the result data in the received information messages.

14. The method for distributed redundant execution of program modules in a distributed system as recited in claim 13, wherein each destination processor which selected one of the information messages sends a second message which identifies which of said at least two processors produced said information messages that were discovered to be unacceptable during said selecting step, to the processors that produced said information messages.

15. The method for distributed redundant execution of program modules in a distributed system as recited in claim 14, wherein said second message identifies which, if any, of said at least two processors executed a same version of the program module.

16. A method for distributed redundant execution of program modules in a distributed system which has at least two processors connected by transmission medium and in which at least first and second different versions of a program module are stored in each of at least two processors, said method comprising the steps of:

asynchronously executing, in each of said at least two processors, any of said at least first and second different versions of a program module which is stored therein to produce result data, after receiving a message containing input data necessary for said asynchronous execution;

checking to conclusion, in each of said at least two processors which executed said one of said at least first and second different versions of the program module, acceptability of the result data produced by said asynchronously executing said one version of said program module based only upon information within each of said at least two processors;

sending, by each of at least two processors which executed one of said at least first and second different versions of the program module, to at least one destination processor an information message which contains at least:
the result data produced by said asynchronously executing said one version of said program module;
said input data utilized during said one version execution; and
information about said executed version and about identity of said sending processor through the transmission medium;

and
receiving, in said at least one destination processor, said information messages and selecting one of the information messages as a new input data message based on the result data and the input data contained in said received information messages.

17. The method for distributed redundant execution of program modules in a distributed system as recited in claim 16, wherein each destination processor which selected one of the received messages sends a second message which identifies which of said at least two processors produced said information messages that were discovered to be unacceptable during said selecting step, to the processors that produced said information messages.

18. The method for distributed redundant execution of program modules in a distributed system as recited in claim 16, wherein said second message identifies which, if any, said at least two processors executed a same version of the program module.

* * * * *